United States Patent
Torfs et al.

(10) Patent No.: US 12,489,738 B2
(45) Date of Patent: Dec. 2, 2025

(54) CONCEPT FOR SHARING DATA

(71) Applicant: Sony Group Corporation, Tokyo (JP)

(72) Inventors: Dimitri Torfs, Stuttgart (DE); Alexandru Serbanati, Stuttgart (DE); Michele Minelli, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 212 days.

(21) Appl. No.: 18/036,408

(22) PCT Filed: Nov. 18, 2021

(86) PCT No.: PCT/EP2021/082228
§ 371 (c)(1),
(2) Date: May 11, 2023

(87) PCT Pub. No.: WO2022/112105
PCT Pub. Date: Jun. 2, 2022

(65) Prior Publication Data
US 2023/0412574 A1    Dec. 21, 2023

(30) Foreign Application Priority Data
Nov. 30, 2020 (EP) .................................. 20210796

(51) Int. Cl.
*H04L 9/40* (2022.01)
*H04L 9/06* (2006.01)
(Continued)

(52) U.S. Cl.
CPC ........ *H04L 63/0435* (2013.01); *H04L 9/0631* (2013.01); *H04L 9/0866* (2013.01); *H04L 9/3073* (2013.01)

(58) Field of Classification Search
CPC ............. H04L 63/0428; H04L 63/0435; H04L 63/045; H04L 9/0819; H04L 9/0825; H04L 9/0847; H04L 9/0838; H04L 9/0816
See application file for complete search history.

(56) References Cited

U.S. PATENT DOCUMENTS 7,580,521 B1 *  8/2009  Spies ................... H04L 9/3073
                                                    380/282
11,379,611 B1 *  7/2022  Horesh .................. H04L 9/008
(Continued)

OTHER PUBLICATIONS

International Search Report and Written Opinion mailed on Feb. 25, 2022, received for PCT Application PCT/EP2021/082228, filed on Nov. 18, 2021, 9 pages.
(Continued)

*Primary Examiner* — Tae K Kim
(74) *Attorney, Agent, or Firm* — XSENSUS LLP

(57) ABSTRACT

The present disclosure relates to a method for sharing data with at least one user, wherein the data is legally owned by a data owner and to be published by a data publisher. The method comprises deriving, by the data owner, a publisher key based on an owner key held by the data owner and providing the publisher key to the data publisher. Further, the method includes deriving, by the data publisher, a symmetric access key based on the publisher key and at least one attribute of a subset of the data and encrypting the subset with the symmetric access key. The method further comprises deriving, by the data owner, the symmetric access key based on the owner key and the attribute, and providing the symmetric access key to the user to enable the user to decrypt using the symmetric access key the subset encrypted by the data publisher.

15 Claims, 3 Drawing Sheets

(51) Int. Cl.
*H04L 9/08* (2006.01)
*H04L 9/30* (2006.01)

(56) References Cited

U.S. PATENT DOCUMENTS

| | | |
|---|---|---|
| 2012/0300936 A1 | 11/2012 | Green |
| 2014/0289513 A1 | 9/2014 | Huang et al. |
| 2015/0213570 A1 | 7/2015 | Li et al. |
| 2017/0346625 A1* | 11/2017 | Yan ........................ G06F 21/602 |
| 2018/0287789 A1 | 10/2018 | Sridharan et al. |
| 2019/0012469 A1* | 1/2019 | Naganuma .......... G06F 21/6227 |
| 2020/0162238 A1* | 5/2020 | Yoon ........................ G06F 21/64 |

OTHER PUBLICATIONS

Yu et al., "Achieving Secure, Scalable, and Fine-grained Data Access Control in Cloud Computing", IEEE INFOCOM 2010, 9 pages.

\* cited by examiner

CONCEPT FOR SHARING DATA

CROSS-REFERENCE TO RELATED APPLICATIONS

The present application is based on PCT filing PCT/EP2021/082228, filed Nov. 18, 2021, which claims priority to EP 20210796.7, filed Nov. 30, 2020, the entire contents of each are incorporated herein by reference.

FIELD

Embodiments of the present disclosure particularly relate to methods, computer programs and a system for sharing data owned by a data owner and to be published by a data publisher.

BACKGROUND

With the increasing number of users of cloud and streaming services, data sharing is becoming more and more important.

In some applications of data sharing, encryption concepts are used for access control. In known encryption concepts, the users (e.g. data consumers) cannot be granted access to data, which is shared via data sharing, before the data is generated or published.

SUMMARY

Hence, there may be a demand for an improved concept for sharing data, and in particular, for granting a user access to data to be generated.

According to one aspect, the present disclosure relates to a method for sharing data with at least one user, wherein the data is owned by a data owner and to be published by a data publisher. The method comprises deriving, by the data owner, a publisher key based on an owner key held by the data owner and providing the publisher key to the data publisher. Further, the method includes deriving, by the data publisher, a symmetric access key based on the publisher key and at least one attribute of a subset of the data and encrypting the subset with the symmetric access key. The method further comprises deriving, by the data owner, the symmetric access key based on the owner key and the attribute, and providing the symmetric access key to the user to enable the user to decrypt using the symmetric access key the subset encrypted by the data publisher.

The data owner, e.g., is a person or group of persons who own the data. That is, the data owner may be understood as an entity which has "full" access to the data and may be able to decrypt and/or share the data. In particular, the data owner may be a legal owner of the data. The data publisher, for example, publishes the data on behalf of the data owner. The data can comprise information, documents, and/or media data.

In context of the present disclosure, the data (to be published) is particularly to be understood as data which is not generated and/or published yet but will be generated and published, i.e. shared with the user or various users in the future. Thus, the data can be understood as so-called "future data".

It should be noted that the subset of data may refer to the (whole) data or a portion of the data to be published. In some applications, the data publisher may publish the future data in several subsets, e.g. for "fine-grained" access control.

A basic idea of the present teaching is that the symmetric access key can be generated based on the attribute by both the data owner and the data publisher. The data owner can derive the symmetric access key using the owner key. Since the owner key is usually to be kept secret, it is not desired to reveal the owner key to the data publisher to enable this to derive the symmetric access key. Instead, the data owner sends the data publisher the publisher key, which also can be used for generating the symmetric key. Additionally, the data owner can provide the user with the symmetric access key to enable the user to decrypt the data, which are encrypted by the data publisher using the symmetric access key.

In general, data publisher and data owner can refer to either separate entities (e.g. separate persons or separate computers) or a single entity. In other words, data owner and data publisher can be the same (single) entity. In practice, data publisher and data owner are separate entities.

The data owner can use a key generation algorithm, a so-called "key generator", with the owner key and the attribute as input to the key generator/key generation algorithm to generate the symmetric access key. The data publisher can use another key generation algorithm to generate the (same) symmetric access key using the publisher key and the attribute as input to the respective key generation algorithm.

A skilled person having benefit from the present disclosure will appreciate that the symmetric access key, the publisher key, and the owner key are cryptographic keys. The symmetric access key is to be understood particularly as a cryptographic key for decrypting data encrypted with the same cryptographic key or a (slightly) transformed form of the cryptographic key. In other words, the symmetric access key complies with a symmetric encryption primitive.

The attribute can relate to a content of the subset. The attribute, for example, comprises a date, a time, a version number, a tag, and a data type of the subset. The skilled person will appreciate that alternatively a multiple attributes can be used in the above method. For example, a plurality of attributes is used to derive the symmetric access key.

In particular, the attribute can be defined before the data is generated. For example, the attribute is predefined based on an expected content of the subset of data. This allows the data owner to provide the user with the symmetric access key before the subset is generated or published. In other words, the data owner can grant the user access to the data before it is generated and/or published.

In some applications, the symmetric access key complies with the Advanced Encryption Standard (AES).

The data owner, the data publisher, and the user, for example, each run an individual data processing circuitry or data processing system for communicating the symmetric access key, the attribute, and the data/subset of data.

The owner key can be kept private in a so-called "wallet" of the data owner. The wallet can be understood as a data storage or a database which merely accessible by the data owner or at least not by the data publisher or the user. The publisher key and the attribute can be also kept secret from the user to prevent the user from creating/generating the symmetric access key himself.

It should be noted that even if the above disclosure merely refers to a single user, the method is not limited to applications of data sharing involving a single user. The skilled person will appreciate that above method can be also used for data sharing involving multiple users.

In some applications, the method comprises providing, by the data publisher, the encrypted subset of the data to the user. As a result, the user can access the subset using the symmetric access key.

In particular, providing the encrypted subset of the data to the user can include providing the encrypted subset of the data to a cloud storage accessible to the user. This allows the user to access the subset without direct interaction with the data publisher. In this way, the user can also access the data repeatedly and "on demand" without a permanent direct connection to the data publisher.

It should be noted that the above method is not limited to one single data publisher but may involve multiple data publisher sharing the data.

In some applications, the method comprises deriving, by the data owner, the publisher key based on the owner key and a publisher identifier associated with the data publisher and deriving, by the data owner, the symmetric access key based on the owner key, the attribute, and the publisher identifier.

The publisher identifier, for example, is used as further input to the key generation algorithm for deriving the publisher key and the symmetric access key, respectively. Either the data publisher or the data owner can predefine and share the publisher identifier for generating the symmetric access key and the publisher key, respectively.

In this way, the method allows to provide multiple data publishers having individual/unique publisher identifiers with different publisher keys. As a result, none of the multiple data publishers can reproduce the symmetric access key of another data publisher to access any of subsets of data encrypted with the symmetric access key of other data publishers. Further, the user can merely access the subset from a respective data publisher using the symmetric access key.

In some applications, the data owner or a data source generating the data predefines the attribute. The data owner, for example, knows the content of the subset of future data and, therefore, can "predict" or anticipate the attribute in accordance with an expected content of the subset. Alternatively, the attribute may be generated automatically using an appropriate algorithm.

In some applications, providing the symmetric access key to the user comprises encrypting the symmetric access key using a public key of a key pair of the user and providing the encrypted symmetric access key to the user to enable the user to decrypt the encrypted symmetric access key using a secret key of the key pair and decrypt using the symmetric access key the subset encrypted by the data publisher.

In this way, the data owner can communicate the symmetric access key securely and prevent "unauthorized" entities from obtaining and using the symmetric access key.

Alternatively, the symmetric access key can be communicated via a "secure" channel between the data owner and the user to prevent the unauthorized entities from obtaining the symmetric access key.

In some applications, the subset of the data includes personal data of the data owner.

The personal data, for example, refers to personal information (e.g. name, date of birth, address of the data owner), motion data (e.g. including whereabouts and trips of the data owner), and/or other private data (e.g. medical findings, education level of the data owner).

In some applications, the method comprises recording the personal data by monitoring the data owner using a sensor.

The sensor, for example, comprises a GPS tracker, a pedometer, and/or medical equipment for monitoring the data owner. The sensor can be implemented in a wearable device or a mobile phone.

The personal data, accordingly, can include sensor data from the sensor. The sensor data can be indicative of a medical condition or whereabouts of the data owner.

According to another aspect, the present disclosure relates to computer program comprising instructions, which, when the computer program is executed by a processor, cause the processor to carry out the above method for sharing data.

According to a further aspect, the present disclosure relates to a method for a data owner owning data to grant access of at least one user to the data, wherein the data is to be published by a data publisher. The method comprises deriving, by the data owner, a publisher key based on an owner key held by the data owner and providing the publisher key to the data publisher to enable the data publisher to derive a symmetric access key based on the publisher key and at least one attribute of a subset of the data and encrypting the subset with the symmetric access key. The method further comprises deriving, by the data owner, the symmetric access key based on the owner key and the attribute, providing the symmetric access key to the user to enable the user to decrypt using the symmetric access key the subset encrypted by the data publisher.

According to another aspect, the present disclosure relates to a computer program comprising instructions, which, when the computer program is executed by a processor, cause the processor to carry out the aforementioned method for a data owner.

According to a further aspect, the present disclosure relates to a method for a data publisher to encrypt data to be published, wherein the data is owned by a data owner. The method comprises deriving a symmetric access key from a publisher key, which is provided by the data owner, and at least one attribute of a subset of the data. The publisher key is derived from an owner key of the data owner and a publisher identifier. The method further comprises encrypting at least one subset of the data with the symmetric access key.

According to a further aspect, the present disclosure relates to a computer program comprising instructions, which, when the computer program is executed by a processor, cause the processor to carry out the aforementioned method for a data publisher.

According to another aspect, the present disclosure relates to a system for sharing data with at least one user, wherein the data is owned by a data owner and to be published by a data publisher. The system comprises a first data processing circuitry controlled by the data owner. The first data processing circuitry is configured to derive a publisher key based on an owner key held by the data owner and a publisher identifier associated with the data publisher and provide the publisher key to the data publisher. The system further comprises a second data processing circuitry controlled by the data publisher. The second data processing circuitry is configured to derive a symmetric access key based on the publisher key and at least one attribute of a subset of the data and encrypt the subset with the symmetric access key. The first data processing circuitry is further configured to derive the symmetric access key based on the owner key, the publisher identifier, and the attribute and provide the symmetric access key to the user to enable the user to decrypt using the symmetric access key the subset encrypted by the data publisher.

The above system may particularly be eligible for executing the above method. Features mentioned in connection with the above method can be therefore applied to the system mutatis mutandis.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
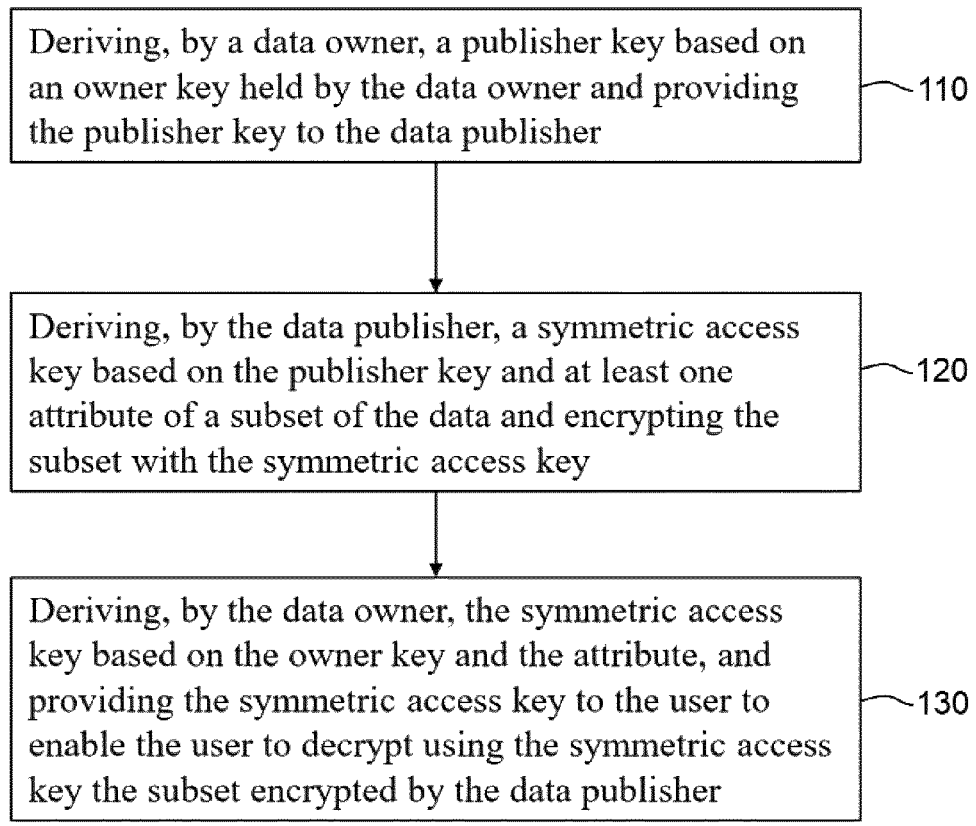
FIG. 1 shows a flowchart schematically illustrating a method for sharing data.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 schematically illustrates a method 100 for sharing data with a user, wherein the data is owned by a data owner and to be published by a data publisher. Method 100 comprises deriving 110, by the data owner, a publisher key based on an owner key held by the data owner and providing the publisher key to the data publisher. Method 100 further comprises deriving 120, by the data publisher, a symmetric access key based on the publisher key and at least one attribute of a subset of the data and encrypting the subset with the symmetric access key. Further, method 100 provides for deriving 130, by the data owner, the symmetric access key based on the owner key and the attribute, and providing the symmetric access key to the user to enable the user to decrypt using the symmetric access key the subset encrypt-ed by the data publisher.

Embodiments of method 100 should be described in more detail with reference to an application of method 100 in a system 200 shown in FIG. 2.

System 200 comprises a first data processing circuitry 210 and a second data processing circuitry 220. The first data processing circuitry 210, for example, is controlled by the aforementioned data owner. The second data processing circuitry 220, for example, is controlled by the aforementioned data publisher. Hence, steps of method 100 which are related to the data owner and the data publisher, respectively, are executed by the first and the second data processing circuitry 210 and 220.

The data owner and the data publisher, for example, refer to two separate/individual entities or persons.

The first data processing circuitry 210 can derive a publisher key 224 based on an owner key 214 held by the data owner. For this, the first data processing circuitry 210 can use a key generation algorithm with the owner key 214 as input to the key generation algorithm. Subsequently, the first data processing circuitry 210 can provide the publisher key 224 to the data publisher, i.e. to the second data processing circuitry 220.

The first data processing circuitry 210, for example, uses a wireless connection for transmitting the publisher key 224 to the second data processing circuitry 220.

The second data processing circuitry 220 can derive a symmetric access key 212 based on the publisher key 224 and an attribute 254 of a subset 250 of the data. For this, the second data processing circuitry 220 can use another key generation algorithm with the publisher key 224 as input to the respective key generation algorithm. In some other applications, multiple attributes of the subset can be used for this. The second data processing circuitry 220 can further encrypt the subset 250 with the symmetric access key 212 and communicate the encrypted subset 252 of data to a cloud storage 240. To this end, the second data processing circuitry 220, for example, connects to the cloud storage 240 via the internet.

The cloud storage 240 is also referred to as "Personal Data Storage (PDS)" of the data owner. In context of the present disclosure, the cloud storage 240 or PDS may refer not only to a physical storage device but also to various software and/or hardware components of interfaces between the data publisher and the user, i.e. the second data processing circuitry 220 and user equipment 230 of the user.

The user equipment 230, for example, is a computer, a mobile phone, a tablet, or the like. The user equipment 230, for example, connects to the cloud storage 240 via the internet to retrieve the encrypted subset 252.

The first data processing circuitry 210 can also derive the symmetric access key 212 based on the owner key 214 and the attribute 254. For this, the first data processing circuitry 210 can use another key generation algorithm with the owner key 224 and the attribute 254 as input to the respective key generation algorithm. Both the first and the second data processing circuitry 210 and 220, for example, receive the attribute from a data source (not shown) providing the subset 250 of data to the second data processing circuitry 220. Alternatively, the first or the second data processing circuitry 210 or 220 is used for generating the attribute 254.

In a next step, the first data processing circuitry 210 can provide the symmetric access key 212 to the user, i.e. to the user equipment 230, to enable the user to decrypt the encrypted subset 252 using the symmetric access key 212. In this way, the data owner grants the user access to the subset 250 of data.

In some applications, the data owner can provide the symmetric access key 212 to the user via the cloud storage 240. To prevent others from using the symmetric access key 212, the data owner may encrypt the symmetric access key 212, as laid out in more detail later.

Figure 2:
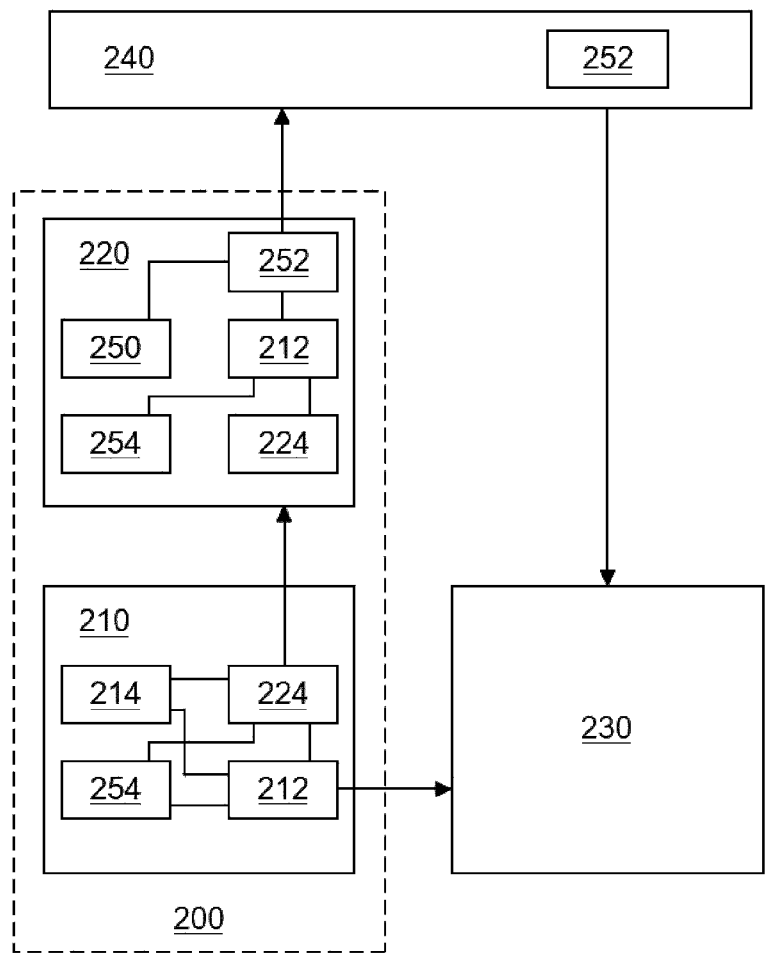
FIG. 2 shows a block diagram schematically illustrating a system for sharing data.

Although it is not explicitly shown in FIG. 2, the first data processing circuitry 210 can connected to the cloud storage 240, e.g. to retrieve the encrypted subset 252. Since the data owner can generate the symmetric access key 212 himself, he can also decrypt the encrypted subset 252 to access the subset 250.

In some use cases, the first data processing circuitry 210 can obtain the attribute 254 before the subset 250 is generated. For example, the attribute is indicative of an expected content of the subset or time when the subset 250 will be generated. This enables the data owner to provide the user equipment 230 with the symmetric access key 212 before the subset 250 is generated and therefore allows the data owner to grant the user access to the subset 250 in advance of generating and publishing the subset 250 of data.

In some applications, the subset 250 corresponds to a total of data which is/will be published.

In some other applications the total of data is/will be published as multiple subsets of the total of data and the data owner can control the user's access to the subsets of the data using the above method 100. In such applications, each of the subsets may have different attributes and therefore different symmetric access keys. In such cases, each of the subsets can be understood as an "access unit" which the user can access on the so-called "most fine-grained" level of access of data. The access unit can comprise one or more data items which, for example, include one or more pdf files or a table of data.

Method 100 and system 200 further can be used to grant multiple users access to one or more subsets of the data. In particular, the method 100 and the system 200 allows the data owner to store its personal data in a secure way such that no unauthorized user can access the data without the data owner's permission. That is, that the data owner can give "controlled" access to others (e.g. relatives, friends, doctor, financial agent).

As the cloud storage 240 may be considered "semi-trusted", the data owner may not want the cloud storage 240, i.e. an entity controlling the cloud storage 240, to access the subset 250. Hence, neither the data owner nor the data publisher typically provides the symmetric access key to the cloud storage 240 in applications of method 100. As a result, the subset 250 can be kept private even if the cloud storage 240 is compromised.

In some applications of method 100 and/or system 200, the data source includes a sensor and the data and the subset 250 of data includes sensor data from the sensor.

The sensor, for example, is a GPS tracker, a step counter, or medical equipment (e.g. a sphygmomanometer or a heart rate monitor). The sensor, for example, is implemented in a wearable (e.g. a wristwatch) or a mobile device of the data owner. In such applications, the subset 250, for example, includes personal data of the owner.

In some applications, the sensor is implemented together with the second data processing circuitry 220, e.g. in a wearable or a mobile phone.

Figure 3A:
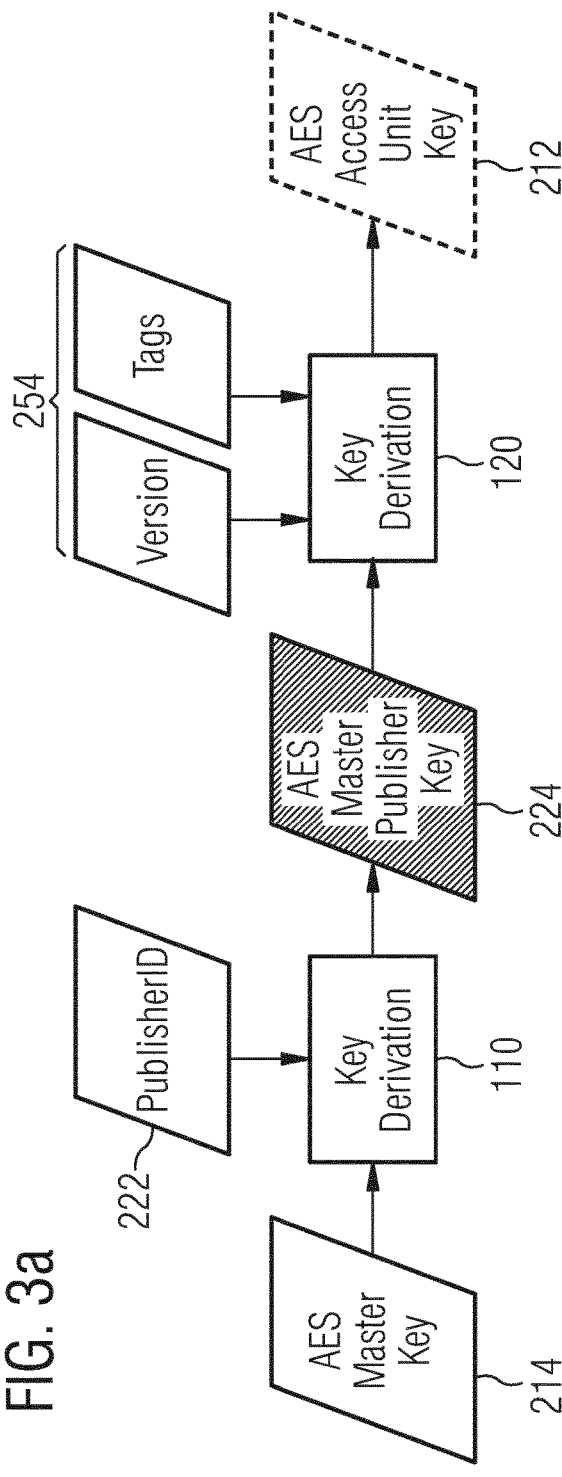
FIG. 3a shows a block diagram schematically illustrating an approach for encrypting data according to the method.
Figure 3B:
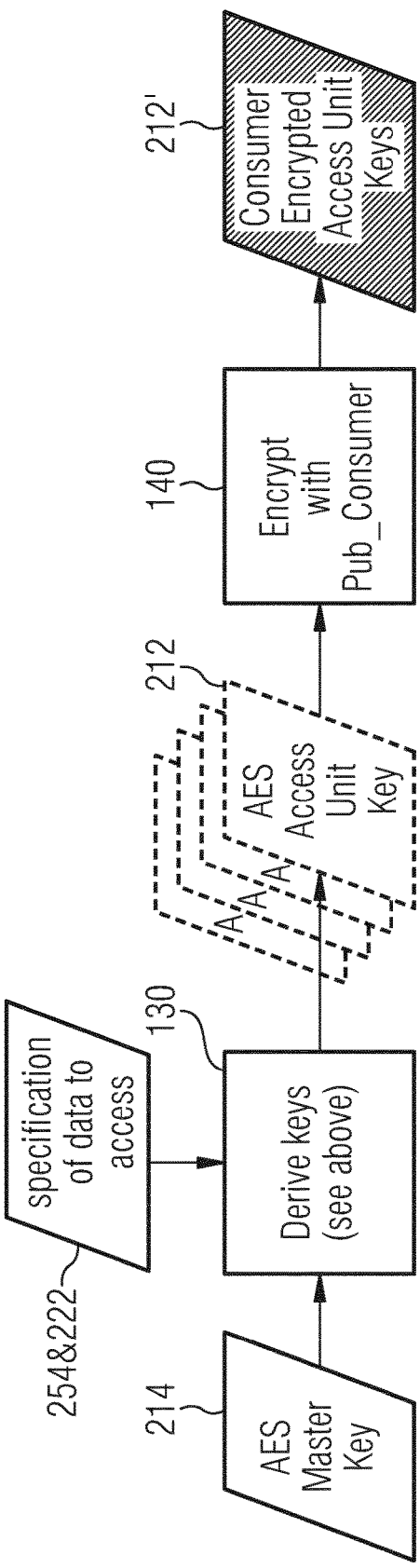
FIG. 3b shows a block diagram schematically illustrating an approach for granting a user access to the encrypted data according to the method.

FIG. 3a and FIG. 3b illustrate an approach for encrypting data and for granting the user access to the encrypted data according to method 100.

FIGS. 3a and 3b particularly refer to applications of method 100 where multiple data publishers are involved.

As can be seen from FIG. 3a, the data owner can use the owner key 214 and a publisher identifier 222 for deriving 110 the publisher key 224. The data owner, for example, runs a respective key generation algorithm on the first data processing circuitry 210 with the owner key 214 and the publisher identifier 222 as input to the key generation algorithm for deriving 110 the publisher key 224. The publisher identifier 222 can be a unique title or label of each of the data publishers. Thus, the publisher key 224 provided to a respective data publisher may be unique among multiple individual publisher keys provided to the data publishers. Therefore, none of the other data publishers can reproduce the symmetric access key 212 using their respective publisher key.

In a subsequent step, the illustrated approach for encrypting the subset 250 provides for deriving 120, by the data publisher, a symmetric access key 212 based on the publisher key 224 and the attribute 254 of the subset 250 of the data for encrypting the subset 250 with the symmetric access key 212.

As can be seen from FIG. 3b, the data owner can use the owner key 214, the publisher identifier 222, and the attribute 254 for deriving 130 the respective symmetric access key 212 which can be used to decrypt the subset 250 encrypted by the respective data publisher. The data owner, for example, runs another key generation algorithm on the first data processing circuitry 210 with the owner key 214, the publisher identifier 222, and the attribute 254 as input to the key generation algorithm for deriving 130 the symmetric access key 212.

Since the symmetric access key 212 is generated based on the publisher identifier 222 in the example of FIGS. 3a and 3b, the symmetric access key 212, in this case, can only be used to decrypt data encrypted by the data publisher having the respective publisher identifier. Therefore, neither the user nor the data publisher of FIGS. 3a and 3b can access data encrypted by other data publishers having different publisher identifiers and using different publisher keys for deriving symmetric access keys.

A further step of the shown approach includes providing 140 the symmetric access key 212 to the user. In order to keep the symmetric access key secret from unauthorized parties, the data owner and the user can apply public-key cryptography (e.g. Rivest-Shamir-Adleman, RSA). In the approach from FIG. 3b, providing the symmetric access key 212 comprises encrypting the symmetric access key 212 using a public key of a key pair of the user and providing an encrypted symmetric access key 212' to the user. Subsequently, the user can decrypt the encrypted symmetric access key 212' using a secret key of the key pair and, for example, decrypt the encrypted subset 252 using the symmetric access key 212.

The skilled person will appreciate that other encryption primitives can be used for a secret communication of the symmetric access key. Alternatively, a secure channel can be used for the secret communication.

The key generation algorithm used by the data publisher for deriving the symmetric access key may be "deterministic". That is, that identical input of the key generation algorithm yields identical output. In the approach of FIGS. 3a and 3b, this means that subsets of the data having same attributes are encrypted with the same symmetric access key.

In turn, the user is able to access multiple subsets having the same attributes. In particular, the user is able to access sequentially published subsets having the same attributes.

This, for example, allows the data owner to grant the user access to multiple subsets of the data to be published (future data).

In practice, the data owner can provide the user, as well as further users, with multiple or a list of symmetric access keys to grant access to multiple subsets which in some cases may be published encrypted by various data publishers. The symmetric keys, again, can be communicated to the user or the users using public-key cryptography.

Further embodiments pertain to:

(1) Method for sharing data with at least one user, wherein the data is owned by a data owner and to be published by a data publisher, the method comprising:
deriving, by the data owner, a publisher key based on an owner key held by the data owner and providing the publisher key to the data publisher;
deriving, by the data publisher, a symmetric access key based on the publisher key and at least one attribute of a subset of the data and encrypting the subset with the symmetric access key; and
deriving, by the data owner, the symmetric access key based on the owner key and the attribute, and providing the symmetric access key to the user to enable the user to decrypt using the symmetric access key the subset encrypted by the data publisher.

(2) Method of (1), comprising:
deriving, by the data owner, the publisher key based on the owner key and a publisher identifier associated with the data publisher; and
deriving, by the data owner, the symmetric access key based on the owner key, the attribute, and the publisher identifier.

(3) Method of (1) or (2), wherein providing the symmetric access key to the user comprises encrypting the symmetric access key using a public key of a key pair of the user and providing the encrypted symmetric access key to the user to enable the user to decrypt the encrypted symmetric access key using a secret key of the key pair and decrypt using the symmetric access key the subset encrypted by the data publisher.

(4) The method of any one of (1) to (3), wherein the method further comprises providing, by the data publisher, the encrypted subset of the data to the user.

(5) The method of (4), wherein providing the encrypted subset of the data to the user includes providing the encrypted subset of the data to a cloud storage accessible to the user.

(6) The method of any one of (1) to (5), wherein the subset of the data includes personal data of the data owner.

(7) The method of (6), further comprising recording the personal data by monitoring the data owner using a sensor.

(8) The method of any one of (1) to (7), wherein the symmetric access key complies with the Advanced Encryption Standard, AES.

(9) The method of any one of (1) to (8), wherein the attribute of the subset of the data comprises at least one of a date, a time, a version number, a tag and a data type of the at least one subset of the data.

(10) The method of any one of (1) to (9), comprising, by the data owner, predefining the attribute.

(11) Computer program comprising instructions, which, when the computer program is executed by a processor, cause the processor to carry out the method of any one of (1) to (10).

(12) Method for a data owner owning data to grant access of at least one user to the data, wherein the data is to be published by a data publisher, the method comprising:
deriving, by the data owner, a publisher key based on an owner key held by the data owner and providing the publisher key to the data publisher to enable the data publisher to derive a symmetric access key based on the publisher key and at least one attribute of a subset of the data and encrypting the subset with the symmetric access key;
deriving, by the data owner, the symmetric access key based on the owner key and the attribute, providing the symmetric access key to the user to enable the user to decrypt using the symmetric access key the subset encrypted by the data publisher.

(13) Computer program comprising instructions, which, when the computer program is executed by a processor, cause the processor to carry out the method of (12).

(14) Method for a data publisher to encrypt data to be published, wherein the data is owned by a data owner, the method comprising:
deriving a symmetric access key from a publisher key, which is provided by the data owner, and at least one attribute of a subset of the data, wherein the publisher key is derived from an owner key of the data owner; and
encrypting at least one subset of the data with the symmetric access key.

(15) Computer program comprising instructions, which, when the computer program is executed by a processor, cause the processor to carry out the method of (14).

(16) A system for sharing data with at least one user, wherein the data is owned by a data owner and to be published by a data publisher, the system comprising:
a first data processing circuitry controlled by the data owner, wherein the first data processing circuitry is configured to:
derive a publisher key based on an owner key held by the data owner; and
provide the publisher key to the data publisher; and
a second data processing circuitry controlled by the data publisher, wherein the second data processing circuitry is configured to:
derive a symmetric access key based on the publisher key and at least one attribute of a subset of the data; and
encrypt the subset with the symmetric access key,
wherein the first data processing circuitry is further configured to:
derive the symmetric access key based on the owner key and the attribute; and
provide the symmetric access key to the user to enable the user to decrypt using the symmetric access key the subset encrypted by the data publisher.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for sharing data with at least one user, wherein the data is owned by a data owner and to be published by a data publisher, the method comprising:
   deriving, by the data owner, a publisher key based on an owner key held by the data owner and providing the publisher key to the data publisher;
   deriving, by the data publisher, a symmetric access key based on the publisher key and at least one attribute of a subset of the data and encrypting the subset with the symmetric access key;
   deriving, by the data owner, the symmetric access key based on the owner key and the at least one attribute, and providing the symmetric access key to the user to enable the user to decrypt using the symmetric access key the subset encrypted by the data publisher;
   encrypting the symmetric access key using a public key of a key pair of the user and providing the encrypted symmetric access key to the user before the subset is generated to enable the user to decrypt the encrypted symmetric access key using a secret key of the key pair and decrypt using the symmetric access key the subset encrypted by the data publisher; and
   transmitting, by the data publisher, the encrypted subset to the user to enable the user to access the subset using the symmetric access key; and
   wherein the at least one attribute is content-specific information about the subset of data that is predefined prior to generation of the subset of data based on an expected content of the subset.

2. The method of claim 1, comprising:
   deriving, by the data owner, the publisher key based on the owner key and a publisher identifier associated with the data publisher; and
   deriving, by the data owner, the symmetric access key based on the owner key, the attribute, and the publisher identifier.

3. The method of claim 1, wherein the method further comprises providing, by the data publisher, the encrypted subset of the data to the user.

4. The method of claim 3, wherein providing the encrypted subset of the data to the user includes providing the encrypted subset of the data to a cloud storage accessible to the user.

5. The method of claim 1, wherein the subset of the data includes personal data of the data owner.

6. The method of claim 5, further comprising recording the personal data by monitoring the data owner using a sensor.

7. The method of claim 1, wherein the symmetric access key complies with the Advanced Encryption Standard, AES.

8. The method of claim 1, wherein the attribute of the subset of the data comprises at least one of a date, a time, a version number, a tag and a data type of the at least one subset of the data.

9. The method of claim 1, comprising, by the data owner, predefining the attribute.

10. A non-transitory computer-readable storage medium storing computer-readable instructions thereon, which, when executed by a processor, cause the processor to carry out the method of claim 1.

11. A method for a data owner owning data to grant access of at least one user to the data, wherein the data is to be published by a data publisher, the method comprising:
   deriving, by the data owner, a publisher key based on an owner key held by the data owner and providing the publisher key to the data publisher to enable the data publisher to derive a symmetric access key based on the publisher key and at least one attribute of a subset of the data and encrypting the subset with the symmetric access key;
   deriving, by the data owner, the symmetric access key based on the owner key and the at least one attribute, providing the symmetric access key to the user to enable the user to decrypt using the symmetric access key the subset encrypted by the data publisher; and
   encrypting the symmetric access key using a public key of a key pair of the user and providing the encrypted symmetric access key to the user before the subset is generated to enable the user to decrypt the encrypted symmetric access key using a secret key of the key pair and decrypt using the symmetric access key the subset encrypted by the data publisher, wherein the at least one attribute is content-specific information about the subset of data that is predefined prior to generation of the subset of data based on an expected content of the subset.

12. A non-transitory computer-readable storage medium storing computer-readable instructions thereon, which, when executed by a processor, cause the processor to carry out the method of claim 11.

13. A method for a data publisher to encrypt data to be published, wherein the data is legally owned by a data owner, the method comprising:

deriving a symmetric access key from a publisher key, which is provided by the data owner, and at least one attribute of a subset of the data, wherein the publisher key is derived from an owner key of the data owner;

encrypting at least one subset of the data with the symmetric access key; and transmitting the encrypted subset to a user to enable the user to access the subset using the symmetric access key, wherein the symmetric access key is provided to the user by the data owner before the subset is generated, wherein the at least one attribute is content-specific information about the subset of data that is predefined prior to generation of the subset of data based on an expected content of the subset.

14. A non-transitory computer-readable storage medium storing computer-readable instructions thereon, which, when executed by a processor, cause the processor to carry out the method of claim 13.

15. A system for sharing data with at least one user, wherein the data is legally owned by a data owner and to be published by a data publisher, the system comprising:

a first data processing circuitry controlled by the data owner, wherein the first data processing circuitry is configured to:
derive a publisher key based on an owner key held by the data owner; and
provide the publisher key to the data publisher; and a second data processing circuitry controlled by the data publisher, wherein the second data processing circuitry is configured to:
derive a symmetric access key based on the publisher key and at least one attribute of a subset of the data;
encrypt the subset with the symmetric access key; and
transmit the encrypted subset to the user to enable the user to access the subset using the symmetric access key;

wherein the first data processing circuitry is further configured to:
derive the symmetric access key based on the owner key and the at least one attribute;
provide the symmetric access key to the user to enable the user to decrypt using the symmetric access key the subset encrypted by the data publisher;
encrypt the symmetric access key using a public key of a key pair of the user and providing the encrypted symmetric access key to the user before the subset is generated to enable the user to decrypt the encrypted symmetric access key using a secret key of the key pair and decrypt using the symmetric access key the subset encrypted by the data publisher; and wherein the at least one attribute is content-specific information about the subset of data that is predefined prior to generation of the subset of data based on an expected content of the subset.

* * * * *